United States Patent [19]

Roscoe

[11] Patent Number: 5,068,938
[45] Date of Patent: Dec. 3, 1991

[54] SELF-LEVELING PLATFORM FOR LOADING DOCKS

[76] Inventor: Frederick Roscoe, 22 S. Newland Ct., Lakewood, Colo. 80226

[21] Appl. No.: 581,899

[22] Filed: Sep. 13, 1990

[51] Int. Cl.⁵ ............................................. E01D 15/00
[52] U.S. Cl. ....................................... 14/71.7; 14/71.5
[58] Field of Search ...................... 14/71.7, 71.1, 71.5, 14/71.3

[56] References Cited

U.S. PATENT DOCUMENTS

| | | | |
|---|---|---|---|
| 2,689,965 | 9/1954 | Fenton | 14/71.7 |
| 2,993,219 | 7/1961 | Pennington | 14/71 |
| 3,175,238 | 3/1965 | Pennington | 14/71 |
| 3,179,968 | 4/1965 | Lambert | 14/71 |
| 3,665,537 | 5/1972 | Turner | 14/71.7 |
| 3,742,147 | 6/1973 | Weese | 14/71.5 |
| 4,343,058 | 8/1982 | Loblick | 14/71.7 |
| 4,382,307 | 5/1983 | Alten | 14/71.7 |
| 4,490,869 | 1/1985 | Norin | 14/71.7 |
| 4,510,638 | 4/1985 | Alten | 14/71.7 |
| 4,551,877 | 11/1985 | Alten | 14/71.7 |
| 4,593,242 | 6/1986 | Beck | 14/71.7 |
| 4,593,424 | 6/1986 | Beck | 14/71.7 |
| 4,727,613 | 3/1988 | Alten | 14/71.7 |
| 4,800,604 | 1/1989 | Alten | 14/71.3 |
| 4,852,197 | 8/1989 | Thomas | 14/71.7 |
| 4,862,547 | 9/1989 | Alten | 14/71.1 |

FOREIGN PATENT DOCUMENTS

| | | | |
|---|---|---|---|
| 2321033 | 4/1973 | Fed. Rep. of Germany | 14/17.7 |
| 2321003 | 11/1974 | Fed. Rep. of Germany . | |
| 2449797 | 4/1976 | Fed. Rep. of Germany . | |
| 2545707 | 4/1977 | Fed. Rep. of Germany . | |
| 3305945 | 8/1984 | Fed. Rep. of Germany . | |
| 0175196 | 8/1986 | Japan | 14/17.7 |

*Primary Examiner*—Bruce M. Kisliuk
*Assistant Examiner*—Nancy P. Connolly
*Attorney, Agent, or Firm*—John E. Reilly

[57] ABSTRACT

A movable loading platform for an elevated loading dock in loading large cargo containers onto and from a vehicle parked alongside the loading dock in which an upper horizontal panel is slidably attached to the dock by a series of plates having elongated channels or slots or insertion of bolts which pass downwardly through the panel, and pneumatic cylinders including a control circuit are positioned at opposite sides of the loading platform for advancing the platform away from the loading dock into flush relationship to the side of the vehicle and in such a way that the platform is self-compensating for any differences in spacing due to misalignment of the side of the truck with respect to the platform.

20 Claims, 2 Drawing Sheets

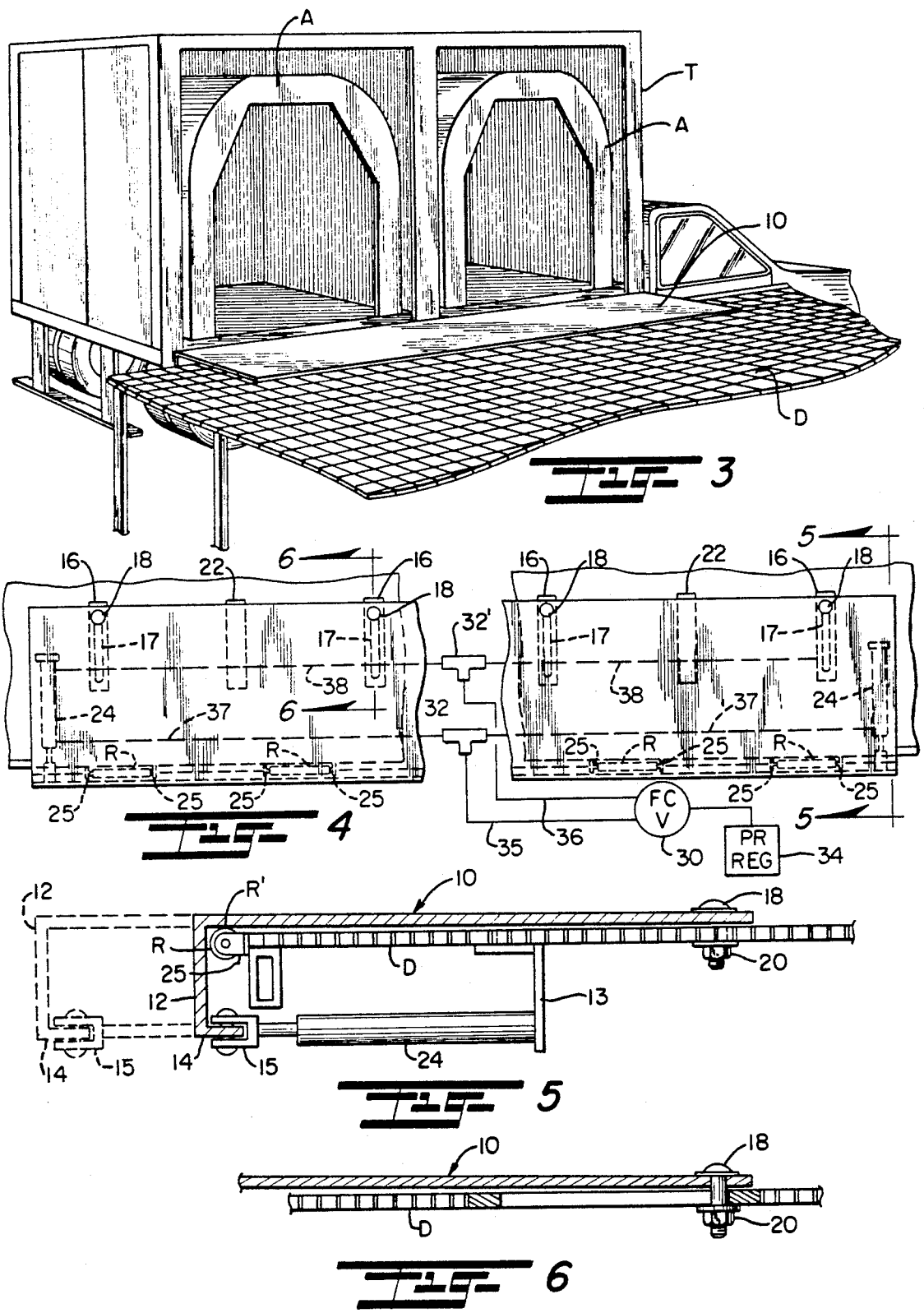

SELF-LEVELING PLATFORM FOR LOADING DOCKS

This invention relates to loading docks and platforms therefor, and more particularly relates to a novel and improved mobile loading platform which is self-compensating for differences in spacing between the platform and the side of a truck when the truck is parked alongside the loading dock.

BACKGROUND AND FIELD OF INVENTION

Loading platforms or ramps have been devised with the goal of compensating for differences in the height of the platform and the truck to be loaded or unloaded. Conventional movable platforms have allowed adjustments such as horizontal extension and vertical elevation of the platform, and have typically been mechanically or hydraulically operated.

In the past, however, movable platforms have not been capable of differential extension of one end of the platform relative to the other, in order to compensate for "non-parallel alignment" of a truck; that is, to cause the platform to move into flush relationship with a side of a truck, where the truck is not parked parallel to the loading dock. In addition, existing platforms have generally required a custom-made dock, or at least one which is substantially modified, with the movable upper surface of the dock pivotally mounted about a horizontal axis. Such platforms include U.S. Pat. Nos. 2,689,965 to Fenton, 3,179,968 to Lambert, 2,993,219 and 3,175,238 to Pennington, and 4,382,307, 4,551,877, 4,727,613, 4,800,604, 4,862,547 as well as German Pat. Nos. 2,321,033, 2,545,707 and 3,305,945 to Alten.

Furthermore, with one exception, none of the existing devices are supported on the top of and slide over said top of an existing loading platform or dock. The German Pat. No. 2,449,797 to Alten appears to disclose a movable device which rests on the top of an existing platform or dock, but which requires a pivotal mounting for the movable extension, thereby precluding the differential extension capability of the present invention.

In addition, none of the previous movable platforms utilizes plural extension cylinders at opposite ends to effect self-compensating differential extension of the platform; nor does any applicable prior art disclose a downturned flange along the outer edge of the platform.

The present invention overcomes a number of inadequacies and disadvantages in prior art loading platforms by providing self-compensation for misalignment of a truck to be loaded, while being relatively simple in construction, with fewer moving and component parts, with an ensuing increase in reliability and decrease in cost to construct and maintain. Further simplicity is achieved by the use of a pneumatic pressure source, which has not been previously considered to be effective in similar applications where it is necessary to synchronize the movement at opposite sides of a large sliding or moving member such as the platform. Importantly, the present invention is accommodated by an existing loading platform or dock without the need for substantial modification thereof, unlike previous platforms which require the entire platform to be pivotally mounted at or near one side and which generally require the use of channels or the like for structural support. Also important is the fact that the present invention minimizes significant safety hazards associated with previous platforms where personnel moving between the dock and the truck are subject to injuries resulting from falling through gaps between the platform and the truck due to misalignment of the truck.

SUMMARY OF INVENTION

It is therefore an object of the present invention to provide for a novel and improved movable loading platform which is self-compensating for misalignment of a truck to be loaded or unloaded.

Another object of the present invention is to provide for a novel and improved movable loading platform which is supported on the top of and slides over said top of an existing loading platform or dock, without requiring any substantial modification to the platform or dock.

A further object of the present invention is to provide for a novel and improved movable loading platform which utilizes extendable cylinders at opposite ends of the platform to extend and retract the platform and to provide self-compensation for parallel misalignment of a truck to be loaded.

A still further object of the present invention is to provide for a movable loading platform which has on its outer edge a downturned flange which affords an enlarged, reinforced limit stop for moving against the side of the vehicle to be loaded and for moving into and against the dock; and wherein the platform is particularly suited for loading air cargo containers onto and off the sides of trucks.

Yet another object of the present invention is to provide for a movable loading platform which is extendable and retractable by pneumatic means, is relatively simple in construction, has a minimum number of moving and component parts, and is therefore more reliable and less expensive to construct and maintain.

A further object of the present invention is to provide for a movable loading platform which eliminates the safety hazard extant where personnel moving between the dock and the truck are subject to injuries resulting from falling through gaps between the platform and the truck due to misalignment of the truck.

In accordance with the present invention, there has been devised a movable loading platform which comprises an upper horizontal panel which extends for the substantial length of a loading dock. The upper panel is slidably attached to the dock by a series of plates having elongated channels or slots for insertion of bolts which pass downwardly through the panel. Intermediate plates between the slotted plates provide flush surfaces for slidable movement of the panel. The entire platform is extended and retracted by spaced pneumatic cylinders which are interconnected through a valve so as to cause the platform to be self-compensating for any differences in spacing due to misalignment of the truck to be loaded.

The above and other objects, advantages and features will become more readily appreciated and understood from a consideration of the following detailed description of preferred and modified forms of the present invention when taken together with the accompanying drawings in which:

BRIEF DESCRIPTION OF THE DRAWINGS

FIG. 3 is a perspective view of the preferred form of invention showing the platform in a partially extended position;

FIG. 4 is a plan view of the preferred form of the present invention, with the platform in a retracted position and schematically illustrating the cylinder control circuit;

FIG. 5 is a cross-sectional view taken about lines 5—5 of FIG. 4; and

FIG. 6 is a cross-sectional view taken about lines 6—6 of FIG. 4.

DETAILED DESCRIPTION OF THE PREFERRED EMBODIMENT

Figure 1:
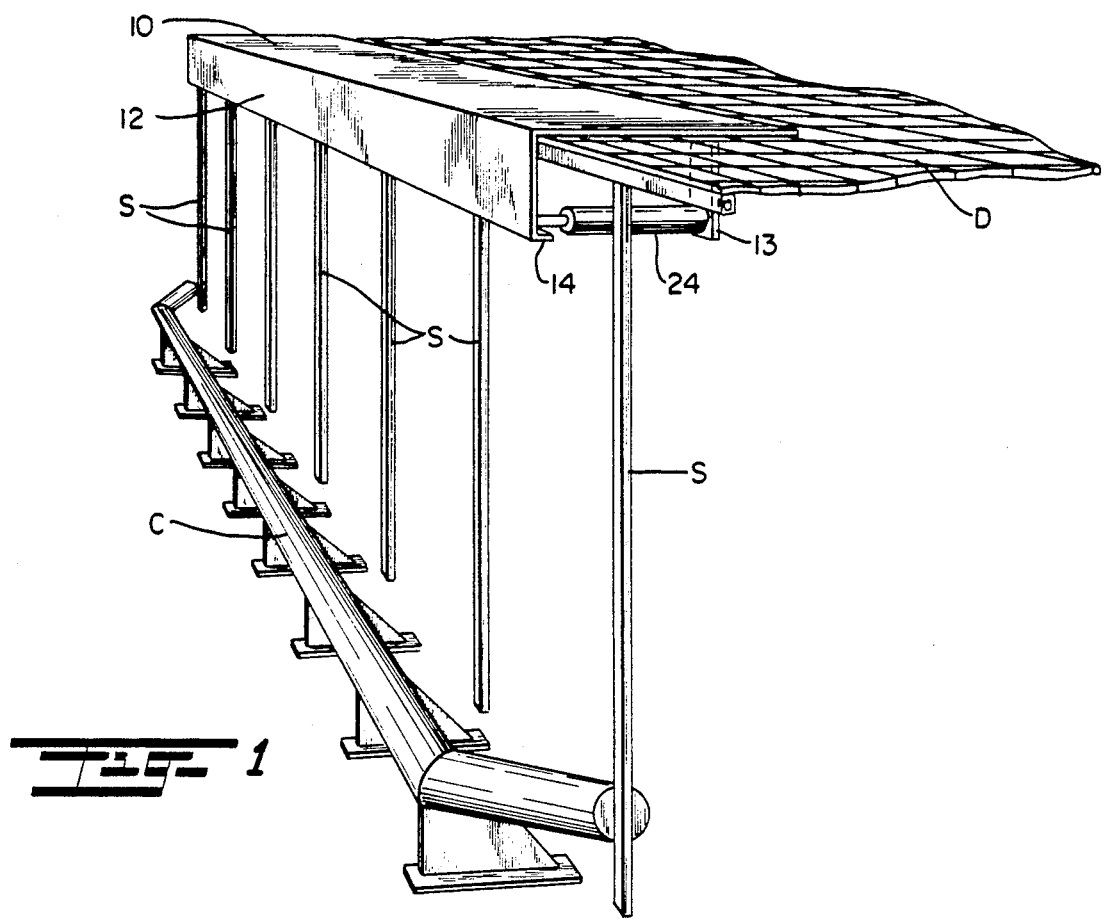
FIG. 1 is a perspective view of a movable loading platform, in accordance with the present invention.

Referring in detail to the drawings, FIGS. 1 to 6 illustrate a preferred form of movable loading platform comprising an upper horizontal panel 10 which traverses the substantial length of a loading dock D with a downturned flange 12 which terminates in a lower edge or lip 14. The flange is typically cushioned on its outer surface with a plurality of rubber sock pads, not shown. The upper panel 10 is slidably secured to the dock D by a series of plates 16 located on top of the dock D, each plate 16 having an elongated channel or slot 17 for reception of a retainer bolt 18 which passes downwardly through the back end of the upper panel 10 and which is secured by a nut 20 on the underside of the dock D. The bolts 18 are typically on a 10' spacing and having washers on top of the panel 10 as well as between the nut 20 and the underside of the dock D. The slots 17 are of a width which is somewhat greater than the diameter of the bolts 18 in order to allow either side of the front end of the platform to extend outward farther than the opposite side, so that the front end of the platform may be positioned non-parallel to the dock. Intermediate plates 22 are positioned on top of the dock D at intervals midway between the plates 16 so as to cooperate with the plates 16 in providing a flush surface for slidable movement of the upper panel 10. The outer end of the panel 10 is supported by rollers R mounted on brackets 25 which are positioned along the outer end of the dock D. The rollers are spaced at intervals across the length of the dock D and project slightly above the surface of the dock D of the plates 16, as shown at R'.

The entire platform is extended and retracted by double-acting air cylinders 24 located below opposite sides of the panel 10. Each air cylinder 24 has one end thereof level with and pivotally attached to the lower edge 14 of the flange 12 by a coupling 15, and the other end of said air cylinder 24 is attached to a vertical leg or bracket 13 which is mounted on the underside of the dock C. The pivotal attachment of each cylinder 24 about a vertical axis through each coupling 15 will permit opposite sides of the platform to move different horizontal distances away from the front end of the loading dock.

In order to compensate for differential movement of opposite ends of the platform, a closed center, four-way pneumatic valve 30 is connected to regulate the delivery of air into and from each cylinder 24. The valve 30 is connected into each of a pair of front and rear tees 32 and 32' located centrally between the cylinders 24. More specifically, the front tee 32 is connected into the leading end of each cylinder 24 to effect return movement of the cylinders 24 and platform 10, and the rear tee 32' is connected into the rearward end of each cylinder 24 to impart forward movement to the cylinders 24, thereby causing corresponding extensions of the platform 10. It is important to note that the tees 32 and 32' are placed in the pneumatic lines 23 and 23' midway between the cylinders 24 for balanced delivery of fluid under pressure to and from the cylinders 24.

The valve 30 has suitable manual control means, not shown, for directing a source of pressurized air from a source, such as, a pressure regulator 34 via lines 35 and 36 through the front and rear tees 32 and 32', respectively. The air is directed from the front tee 32 through delivery lines 37 to the front end of each cylinder 24 in retracting the cylinder and from tee 32 through lines 38 to the rear end of each cylinder 24 in extending the cylinders.

In extending the cylinders 24, the platform 10 is advanced from the full line to the dotted line position shown in FIG. 5 into engagement with the side of the truck V. If there should be any misalignment between the end of the platform 10 and the side of the truck V so that one side of the platform should engage the side of the truck V prior to the opposite side of the platform 10, a portion of the fluid under pressure will be redirected from one cylinder 24 to the other cylinder 24 until the flange 12 has moved into flush relation to the side of the truck. Oversizing of the slots 17 with respect to the bolts 18 and pivotal connection of the cylinders 24 to horizontally spaced locations at the front end of the platform 10 as described will permit opposite sides of the platform to move different distances in advancing into the desired flush relationship to the truck, as shown in FIG. 2.

In accordance with well-known practice, the flow control valve 30 will permit return flow of air under pressure from the front ends of the cylinders 24 via tee 32 and line 35 to a reservoir or tank, not shown, when fluid under pressure is directed through the lines 38 to extend the cylinders. Conversely, when the loading operation is completed, the flow control valve 30 is shifted to deliver fluid under pressure via lines 37 to the front ends of the cylinders 24 to retract the platform, and return air is directed through the rear tee 32' from the rear ends of the cylinders 24 via the flow control valve 30 into the tank.

The raised position of the rollers R will cause slight upward tilting of the platform 10 so that there is a minimum of drag or resistance created between the platform and loading dock as the platform is extended or retracted. In this relation, it will be evident that the bolts 18 may be omitted so that the platform 10 is supported at its rear end by non-slotted plates, such as, the plates 22. In this manner, the platform 10 would be positively attached only to the couplings 15 at the front ends of the cylinders 24, and the weight drag on the rear end of the platform will tend to resist any force applied by the cylinders 24 sufficiently to prevent jamming and maintain a balanced relationship as the cylinders 24 are actuated to extend the platform 10 away from the dock D.

Figure 2:
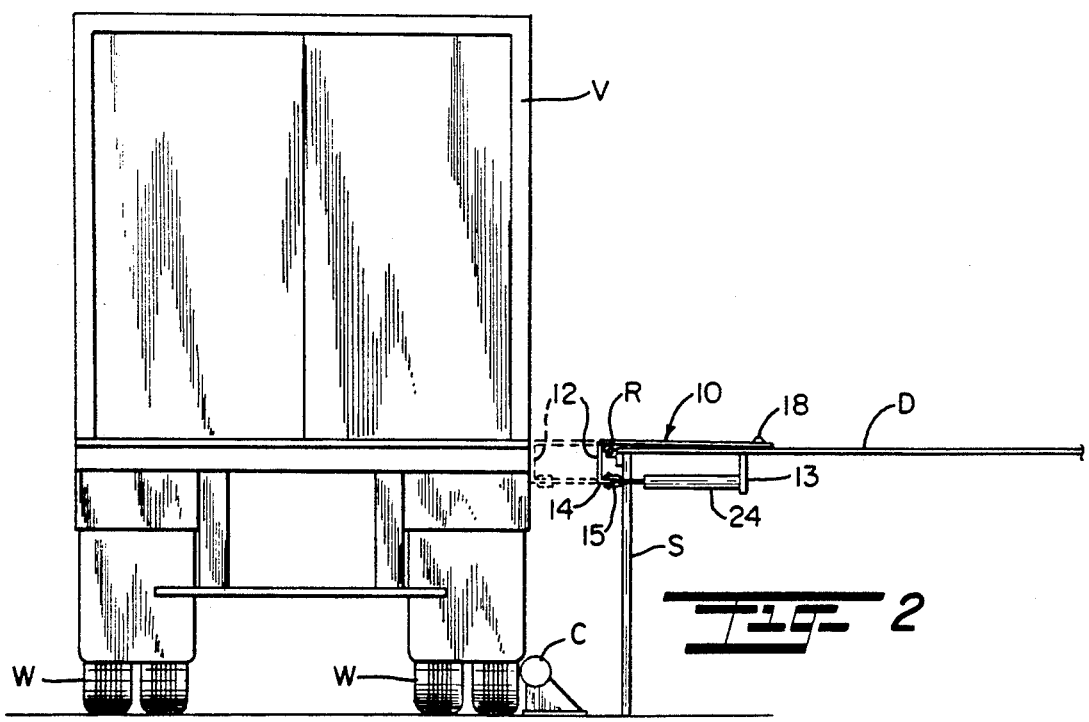
FIG. 2 is a side elevational view of the preferred form of invention showing the platform in dotted in its extended position.

As a setting for the present invention and as illustrated in FIGS. 1 to 3, a typical loading dock D is elevated on a suitable frame having front standards S along the front end of the dock, and a curbing C is disposed in front of and along the base of the loading dock D. The curb C serves as a guide for the ground-engaging wheels W of a truck or other vehicle V in steering it up to the loading dock for loading and unloading cargo. Typically, in air cargo applications, the truck V is provided with side openings for the purpose of loading extremely large, heavyweight air cargo containers A onto and from the side of the truck. It is therefore important that the platform 10 as described be movable into flush relationship along the substantial length of the loading area of the truck, not only for ease of movement of the cargo containers onto and from the truck but to prevent accidental falls by personnel in loading and unloading the truck.

It is therefore to be understood that the foregoing and other modifications and changes may be made in the construction and arrangement comprising the preferred form of the present invention without departing from the spirit and scope thereof as defined by the appended claims and reasonable equivalents thereof.

I claim:

1. A movable loading platform apparatus for an elevated loading dock in loading and unloading cargo onto and from a cargo-receiving receptacle alongside a front end of said dock, said apparatus comprising:
   a horizontal panel having a front end and a back end;
   panel support means for slidably supporting said panel on said dock for extension and retraction toward and away from said receptacle; and
   activating means for extending said panel toward the receptacle such that said front end of said panel is disposed in closely spaced, parallel relation to one side of said receptacle notwithstanding any misalignment between said one side of said receptacle and said front end of said dock, said activating means being pivotally connected to horizontally spaced locations on said front end of said panel for differential pivotal movement of said panel in a horizontal plane in moving into parallel relation to said one side of said receptacle.

2. In a movable loading platform according to claim 1, said panel support means having a plurality of spaced plates mounted on said dock, said panel being slidably disposed on said plates.

3. In a movable loading platform according to claim 1, said panel support means including a plurality of spaced rollers positioned parallel to and in fixed relation to said front end of said dock at a height such that the top of said rollers are slightly higher than said dock thereby tilting said front end of said panel above said back end.

4. In a movable loading platform according to claim 1, means for guiding said panel in a direction toward and away from said receptacle.

5. In a movable loading platform according to claim 1, a downturned vertical flange extending the substantial width of said front end of said panel.

6. In a movable loading platform according to claim 1, said activating means comprising:
   a plurality of fluid-actuated cylinders disposed at opposite sides of said panel, a front end of each of said cylinders being pivotally connected to said panel, and a back end of each of said cylinders being connected to said dock;
   a source of pressurized fluid for actuating said cylinders;
   valve means for directing said pressurized fluid through said cylinders to selectively effect extension and retraction of said panel; and
   means for equalizing fluid pressure between said cylinders whereby excess pressure in one of said cylinders is delivered to the other of said cylinders until fluid pressure is equalized in said cylinders.

7. A movable loading platform apparatus for an elevated loading dock in loading and unloading articles onto and from a vehicle parked alongside a front end of said dock, said apparatus comprising:
   a plurality of spaced plates mounted on said dock;
   a horizontal panel having a front end and a back end, said panel being slidably disposed on said plates;
   guide means for guiding said panel toward and away from said vehicle;
   selected of said plates having a longitudinal elongated slot for reception of said guide means to guide said panel toward and away from said front end of said dock when said panel is extended or retracted; and
   activating means for extending and retracting said panel toward and away from closely spaced, parallel relation to a side of said vehicle notwithstanding any misalignment between the said side of said vehicle and said front end of said loading dock, said including horizontal pivot means activating means pivotally connected to opposite sides of said panel for differential horizontal movement of said opposite sides of said panel away from said front end of said loading dock in moving into parallel relatioon to said side of said vehicle.

8. In a movable loading platform according to claim 7, a plurality of spaced rollers positioned parallel to said front end of said dock for slidably supporting said panel, said rollers mounted in fixed relation to said front end of said doc at a height such that the top of said rollers is higher than that of said dock thereby tilting said front end of said panel above said back end.

9. In a movable loading platform according to claim 7, a downturned vertical flange extending the substantial width of said front end of said panel.

10. In a movable loading platform according to claim 9, said flange terminating in a rearwardly extending horizontal lower edge and including horizontal pivot means for mounting said activating means.

11. In a movable loading platform according to claim 7, said guide means comprising a bolt and a nut, said bolt passing downwardly through said panel and engaging said nut on the underside of said dock so as to maintain said panel in relatively closely-spaced relation to said dock.

12. In a movable loading platform according to claim 7, said activating means comprising:
   a plurality of fluid-actuated cylinders disposed at opposite sides of said panel, a front end of each of said cylinders being pivotally connected to said panel, and a back end of each of said cylinders being connected to said dock;
   a source of pressurized fluid for actuating said cylinders;
   valve means for directing said pressurized fluid through said cylinders to selectively effect extension and retraction of said panel; and
   means for equalizing fluid pressure between said cylinders whereby excess pressure in one of said cylinders is delivered to the other of said cylinders until said fluid pressure is equalized in said cylinders, thereby effecting self-compensation for any nonparallel alignment between said front end of said panel and said side of said vehicle.

13. In a movable loading platform according to claim 12, said valve means comprising:
   a fluid delivery line and a fluid return line connected into each of said cylinders, said delivery line for imparting extension to said cylinders, and said return line for imparting retraction of said cylinders; and manual control means for selectively directing said pressurized fluid into said delivery line and said return line.

14. In a movable loading platform according to claim 12, said pressure equalizing means comprising:
a front tee and a rear tee, said front tee connected into said front end of each of said cylinders, and said rear tee connected into said back end of each of said cylinders, each of said tees being disposed near the midpoint of said lines connecting said cylinders;
said delivery line being connected into each of said cylinders through said rear tee, and said return line being connected into each of said cylinders through said front tee; and
said valve means connected to said front tee through said return line, said valve also connected to said rear tee through said delivery line.

15. In a movable loading platform according to claim 7, an intermediate non-slotted plate being positioned midway between each of said slotted plates thereby providing a more nearly continuous flush surface for slidable movement of said panel.

16. A movable loading platform apparatus for an elevated loading dock in loading and unloading articles onto and from a vehicle parked alongside a front end of said dock, said apparatus comprising:
a plurality of spaced plates mounted on said dock;
a horizontal panel having a front end, a back end, and a downturned vertical flange extending the substantial width of said front end of said panel;
a plurality of spaced rollers positioned parallel to said front end of said dock, said rollers mounted near said front end of said dock at a height such that the top of said rollers is slightly higher than that of said dock;
the frontmost part of said panel resting on said rollers, and said back end of said panel being slidably disposed on said plates;
guide means for guiding said panel toward and away from said vehicle comprising a bolt and a nut, said bolt passing downwardly through said panel and engaging said nut on the underside of said dock, so as to maintain said panel in relatively closely spaced relation to said dock;
selected of said plates having a longitudinal elongated slot for reception of said guide means, said slots cooperating with said guide means to guide said panel in a generally longitudinal direction when said panel is extended or retracted; and
self-compensating means for extending and retracting said panel toward and away from closely spaced, parallel relation to a side of said vehicle, notwithstanding any non-parallel alignment between said side of said vehicle and said front end of said loading dock.

17. In a movable loading platform according to claim 16, said self-compensating means comprising:
a plurality of pneumatic cylinders disposed at opposite sides of said panel, a front end of each of said cylinders being connected to said panel, and a back end of each of said cylinders being connected to said dock;
a source of pressurized air for actuating said cylinders;
valve means for directing said pressurized air through said cylinders to selectively effect extension and retraction of said panel;
means for equalizing air pressure between said cylinders whereby excess air pressure is generated in one of said cylinders due to contact of one side of said front end of said panel with said side of said vehicle; and
said equalizing means delivering sufficient of said excess pressure to the other of said cylinders until said air pressure is equalized in said cylinders thereby causing the other side of said front end of said panel to extend until engaging said side of said vehicle in flush relation and effecting self-compensation for any nonparallel alignment between said front end of said panel and said side of said vehicle.

18. In a movable loading platform according to claim 16, said slots being greater in width than the diameter of said bolts, thereby preventing jamming of said panel when said end of said panel is urged into a position non-parallel to the front edge of said loading dock.

19. In a movable loading platform according to claim 16, said flange terminating in a rearwardly extending horizontal lower edge for mounting said activating means.

20. In a movable loading platform according to claim 19, said dock having a plurality of brackets mounted on the underside of said dock, said front end of each of said cylinders being connected to said horizontal lower edge of said flange, and said back end of each of said cylinders being connected to one of said brackets.

* * * * *